United States Patent
Chen

(10) Patent No.: US 11,997,224 B2
(45) Date of Patent: May 28, 2024

(54) ELECTRONIC DEVICE AND CONTROL METHOD AND CONTROL APPARATUS THEREFOR, STORAGE MEDIUM, AND PROCESSOR

(71) Applicant: Gree Electric Appliances, Inc. of Zhuhai, Guangdong (CN)

(72) Inventor: Zeqing Chen, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 251 days.

(21) Appl. No.: 17/440,629

(22) PCT Filed: Dec. 27, 2019

(86) PCT No.: PCT/CN2019/128928
§ 371 (c)(1),
(2) Date: Sep. 17, 2021

(87) PCT Pub. No.: WO2020/224273
PCT Pub. Date: Nov. 12, 2020

(65) Prior Publication Data
US 2022/0166864 A1 May 26, 2022

(30) Foreign Application Priority Data
May 9, 2019 (CN) .......................... 201910384859.X

(51) Int. Cl.
*H05K 5/00* (2006.01)
*H04M 1/02* (2006.01)

(52) U.S. Cl.
CPC ........ *H04M 1/0266* (2013.01); *H05K 5/0017* (2013.01)

(58) Field of Classification Search
CPC ........... H05K 7/20281; H05K 7/20272; H05K 7/20627; H05K 7/20
See application file for complete search history.

(56) References Cited

U.S. PATENT DOCUMENTS 5,774,333 A * 6/1998 Janik ..................... G06F 1/1632
361/679.48
6,060,969 A * 5/2000 Hufgard ................. H03K 17/97
324/207.21

(Continued)

FOREIGN PATENT DOCUMENTS

CN 103516840 A 1/2014
CN 207441146 U 6/2018

(Continued)

OTHER PUBLICATIONS

International Search Report, with a mailing date of Mar. 26, 2020, in International application No. PCT/CN2019/128928, filed on Dec. 27, 2019.

(Continued)

*Primary Examiner* — Abhishek M Rathod
(74) *Attorney, Agent, or Firm* — McAndrews, Held & Malloy, Ltd.

(57) ABSTRACT

The disclosure provides an electronic device and a control method and control apparatus therefor, a storage medium, and a processor. The electronic device includes: a body; a display screen, located on a surface of the body, wherein the display screen includes a plurality of sub-screens; an actuating structure, connected with the display screen and configured to deform at different temperatures to change an included angle between at least two adjacent sub-screens; and at least one current drive structure, electrically connected with the actuating structure and configured to input current to the actuating structure to deform the actuating structure. The electronic device can control the included angle between the two adjacent sub-screens to reach a predetermined included angle by merely controlling the current of the current drive structure, and a user does not (Continued)

need to fold or unfold the display screen by hand, such that user experience is good.

8 Claims, 2 Drawing Sheets

(56) References Cited

U.S. PATENT DOCUMENTS

| | | | | |
|---|---|---|---|---|
| 9,324,303 | B2* | 4/2016 | Ma | G06F 3/1446 |
| 2010/0064244 | A1* | 3/2010 | Kilpatrick, II | H04M 1/0243 |
| | | | | 345/1.3 |
| 2014/0003006 | A1* | 1/2014 | Ahn | G06F 1/1679 |
| | | | | 361/749 |
| 2014/0029177 | A1* | 1/2014 | Ohtaka | G06F 1/1628 |
| | | | | 361/679.01 |
| 2014/0118910 | A1* | 5/2014 | Sung | G02F 1/133305 |
| | | | | 361/679.01 |
| 2014/0375660 | A1* | 12/2014 | Tamaki | G06F 1/1652 |
| | | | | 345/522 |
| 2015/0378422 | A1* | 12/2015 | Sun | G06F 1/1677 |
| | | | | 361/679.01 |
| 2017/0147067 | A1* | 5/2017 | Levesque | G06F 3/016 |
| 2017/0181304 | A1* | 6/2017 | Lee | H05K 7/005 |
| 2017/0357292 | A1* | 12/2017 | Cho | H04M 1/0216 |
| 2019/0098374 | A1* | 3/2019 | Clevorn | H04N 23/611 |
| 2021/0083210 | A1* | 3/2021 | Wang | C22C 38/18 |

FOREIGN PATENT DOCUMENTS

| | | |
|---|---|---|
| CN | 109166462 A | 1/2019 |
| CN | 109345958 A | 2/2019 |
| CN | 110113456 A | 8/2019 |
| CN | 110113457 A | 8/2019 |
| WO | 2019028708 A1 | 2/2019 |

OTHER PUBLICATIONS

Chinese search report dated Mar. 28, 2022 in Chinese application No. 20190384859X (3 pages).

* cited by examiner

ELECTRONIC DEVICE AND CONTROL METHOD AND CONTROL APPARATUS THEREFOR, STORAGE MEDIUM, AND PROCESSOR

CROSS REFERENCE TO RELATED APPLICATIONS

This application is a 371 of International Patent Application No. PCT/CN2019/128928, filed Dec. 27, 2019, which claims benefit of Chinese patent application No. 201910384859, applied on 9 May 2019, and entitled "Electronic device and control method and control apparatus therefor, storage medium, and processor", which is incorporated in its entirety herein as a reference.

TECHNICAL FIELD

The disclosure relates to the field of electronic devices, in particular to an electronic device and a control method and control apparatus therefor, a storage medium, and a processor.

BACKGROUND

Nowadays, electronic devices (e.g. mobile phones) with foldable display screens are commonly used, and the display screens need to be folded or unfolded manually through mechanical rotary shafts or flexible materials.

However, in some special occasions or in specific postures, it is inconvenient to fold or unfold these display screens to realize multi-screen operation, which renders user experience poor. For instance, the users have to sit up from lying postures to fold or unfold the display screens.

The above information disclosed in the background art is only intended to enhance understanding of the background art of techniques described herein, and therefore, the background art may contain certain information that is not shown in the prior art for those skilled in the art.

SUMMARY

The main purpose of the disclosure is to provide an electronic device and a control and apparatus therefor, a storage medium, and a processor, so as to solve the problem known to the inventor that a user needs to fold or unfold a display screen of an electronic device by hand, such that user experience is poor.

In order to realize the above purpose, according to one aspect of the disclosure, the electronic device is provided. The electronic device includes a body; a display screen, located on a surface of the body, wherein the display screen includes a plurality of sub-screens; an actuating structure, connected with the display screen and configured to deform at different temperatures to change an included angle between at least two adjacent sub-screens; and at least one current drive structure, electrically connected with the actuating structure, and configured to input current to the actuating structure to deform the actuating structure.

In one embodiment, the electronic device further includes: at least one angle sensor, located at an interior or on a surface of the display screen and is configured to sense the included angle between any two adjacent sub-screens of the display screen.

In one embodiment, any two adjacent sub-screens are a first sub-screen and a second sub-screen, and the angle sensor includes a magnet part and an induction part, the magnet part is located at an interior or on a surface of the first sub-screen, and the induction part is located at an interior or on a surface of the second sub-screen.

In one embodiment, the magnet part is mirror imaging symmetrical to the induction part based on an interface between the first sub-screen and the second sub-screen.

In one embodiment, there are a plurality of angle sensors and the plurality of angle sensors are arranged at intervals.

In one embodiment, the display screen is a flexible display screen.

In one embodiment, the display screen further includes a rotary shaft connected between at least two adjacent sub-screens, wherein the rotary shaft is connected with the actuating structure, and the actuating structure is configured to deform to drive the rotary shaft to rotate, so as to make the included angle between at least two adjacent sub-screens change.

In one embodiment, there are a plurality of actuating structures and the plurality of actuating structures are arranged at intervals in a length direction of the rotary shaft.

In one embodiment, the actuating structure may be made of memory metal.

In order to realize the above purpose, according to one aspect of the disclosure, the control method for any one of the above electronic devices includes: receiving a control command, wherein the control command is set to adjust an included angle between two adjacent sub-screens to reach a predetermined included angle; determining a predetermined drive current for driving an actuating structure to deform according to the predetermined included angle in the control command; and controlling at least one current drive structure to input the predetermined drive current to the actuating structure, so as to enable the included angle between the two sub-screens to reach the predetermined included angle.

In one embodiment, determining a predetermined drive current for driving an actuating structure to deform according to the predetermined included angle in the control command, includes: determining a predetermined deformation quantity of the actuating structure according to the predetermined included angle; and determining the predetermined drive current corresponding to the predetermined deformation quantity according to a relation between a deformation quantity of the actuating structure and a drive current.

In one embodiment, determining a predetermined deformation quantity of the actuating structure according to the predetermined included angle, includes: acquiring a current included angle, which is predetermined and controlled, between the two adjacent sub-screens; determining a difference of included angle between the two sub-screens according to the predetermined included angle in the control command and the current included angle; and determining the predetermined deformation quantity according to the difference.

In one embodiment, the control command is a voice control command.

According to the other aspect of the disclosure, the control apparatus for an electronic device is provided. The control apparatus includes: a reception unit, which is configured to receive a control command, wherein the control command is set to adjust an included angle between two adjacent sub-screens to reach a predetermined included angle; a determination unit, which is configured to determine a predetermined drive current for driving an actuating structure to deform according to the predetermined included angle in the control command; and a control unit, which is configured to control at least one current drive structure to input the predetermined drive current to the actuating structure, so as to enable the included angle between the two sub-screens to reach the predetermined included angle.

According to the other aspect of the disclosure, an electronic device is provided. The electronic device includes: a body; a display screen, located on a surface of the body, wherein the display screen includes a plurality of sub-screens; an actuating structure, connected with the display screen and configured to deform at different temperatures to change an included angle between at least two adjacent sub-screens; at least one current drive structure, electrically connected with the actuating structure and configured to input current to the actuating structure to deform the actuating structure; and a control apparatus, which is configured to at least control operation of the current drive structure.

According to the other aspect of the disclosure, the storage medium includes a stored program, wherein the program implements any one of the above methods.

According to the other aspect of the disclosure, the processor is configured to run a program, wherein when the program is run, any one of the above methods is implemented.

According to the technical solution of the disclosure, the electronic device includes the actuating structure and the current drive structure, and since shapes of the actuating structure are different at different temperatures, the current drive structure provides different currents to the actuating structure to enable temperatures of the actuating structure to vary, such that the shapes of the actuating structure may vary. Therefore, in the electronic device, by introducing, by means of the current drive structure, the predetermined drive current to the actuating structure, the actuating structure may generate predetermined deformation; and through predetermined deformation of the actuating structure, the included angle between at least two adjacent sub-screens may be the predetermined included angle, thereby meeting user requirements. That is, the electronic device may control the included angle between the two adjacent sub-screens to reach the predetermined included angle by merely controlling the current of the current drive structure, and the user does not need to fold or unfold the display screen by hand, such that user experience is good.

BRIEF DESCRIPTION OF THE DRAWINGS

The accompanying drawings constituting a part of the description serve to provide a further understanding of the disclosure, and the illustrative embodiments of the disclosure and the description of the illustrative embodiments serve to explain the disclosure and are not to be construed as unduly limiting the disclosure. In the accompanying drawings.

Figure 1:
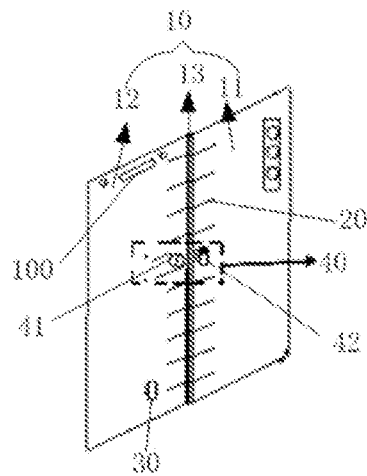
FIG. 1 shows a local structural schematic diagram of the embodiments of an electronic device according to the disclosure.

The above accompanying drawings include the following reference numerals:

10. display screen; 11. first sub-screen; 12. second sub-screen; 13. rotary shaft; 20. actuating structure; 30. current drive structure; 40. angle sensor; 41. magnet part; 42. induction part; 100. reception unit; 200. determination unit; 300. control unit.

DETAILED DESCRIPTION OF THE EMBODIMENTS

It should be noted that the embodiments in the disclosure and features in the embodiments may be combined without conflicts. The disclosure will be described in detail below with reference to the accompanying drawings in conjunction with embodiments.

In order to make those skilled in the art better understand the solutions of the disclosure, the technical solutions in the embodiments of the disclosure will be described below clearly and comprehensively in conjunction with the accompanying drawings in the embodiments of the disclosure. Apparently, the embodiments described are merely some of rather than all embodiments. On the basis of the embodiments of the disclosure, all other embodiments obtained by those of ordinary skill in the art without making inventive efforts should all fall within the protection scope of the disclosure.

It should be noted that terms "first", "second" and so forth, in the description and claims of the disclosure and in the above accompanying drawings, are set to distinguish between similar objects and not necessarily to describe a particular order or sequential order. It should be understood that data used in this way may be interchanged where appropriate, so as to conveniently describe the embodiments of the disclosure. In addition, terms "include", "have", and any variations thereof are intended to cover non-exclusive inclusions, for example, processes, methods, systems, products, or devices that contain a series of steps or units need not be limited to those explicitly listed steps or units, but may include other steps or units not explicitly listed or inherent to these processes, methods, products, or devices.

It should be understood that when an element (e.g. a layer, a film, a region, or a substrate) is described as being "on" the other element, the element may be directly on the other element, or an intermediate element may also be present. Furthermore, in the description and claims, when an element is described as being "connected" to the other element, the element may be "directly connected" to the other element or "connected" to the other element by means of a third element.

As described in the background art, in the technical solutions known to the inventor, display screens of common electronic devices (e.g. mobile phones) with flexible screens need to be folded or unfolded manually by users through mechanical rotary shafts or flexible materials. In order to solve the technical problem, according to the embodiments of the disclosure, the disclosure provides an electronic device, which includes a body, a display screen, an actuating structure and at least one current drive structure. FIG. 1 shows a local structural schematic diagram of the electronic device of the disclosure, but does not shows the body. The display screen 10 is located on a surface of the body, and the display screen 10 includes a plurality of sub-screens; the actuating structure 20 is connected with the display screen 10, and the actuating structure 20 deforms at different temperatures to change an included angle between at least two adjacent sub-screens; and the current drive structure 30 is electrically connected with the actuating structure 20, and the current drive structure 30 inputs current to the actuating structure 20 to deform the actuating structure 20.

The electronic device includes the actuating structure and the current drive structure, and since shapes of the actuating structure are different at different temperatures, the current drive structure provides different currents to the actuating structure to enable temperatures of the actuating structure to vary, such that the shapes of the actuating structure may vary. Therefore, in the electronic device, by introducing, by means of the current drive structure, the predetermined drive current to the actuating structure, the actuating structure may generate predetermined deformation; and through predetermined deformation of the actuating structure, the included angle between at least two adjacent sub-screens may be a predetermined included angle, thereby meeting user requirements. That is, the electronic device may control the included angle between two adjacent sub-screens to reach the predetermined included angle by merely controlling the current of the current drive structure, and the user does not need to fold or unfold the display screen by hand, such that user experience is good.

It should be noted that the display screen of the disclosure includes a plurality of sub-screens, which actually means that the display screen may be divided into the plurality of sub-screens for use, wherein extending directions of the sub-screens may be the same or different, and specifically, two or more than two sub-screens may be arranged according to actual conditions. In one embodiment of the disclosure, as shown in FIG. 1, the display screen 10 includes the two sub-screens.

In a practical use process, movements of the two sub-screens need to be controlled according to initial states thereof, so as to enable the included angle between the two sub-screens to reach the predetermined included angle. In one embodiment of the disclosure, as shown in FIG. 1, the electronic device further includes an angle sensor 40, wherein the angle sensor 40 is located at an interior or on a surface of the display screen 10, and the angle sensor 40 is configured to sense the included angle between any two adjacent sub-screens of the display screen 10. In this way, by controlling the movements of the two sub-screens according to the initial states thereof, it is further ensured that the included angle between the two sub-screens is the predetermined included angle.

It should be noted that the angle sensor may be arranged at the interior or on the surface of the display screen, but in view of practicality and reliability, the angle sensor is arranged at the interior of the display screen. In one embodiment, the display screen includes a first display layer, a second display layer and a support layer. The first display layer is a material layer made of a polymer material, the second display layer is a material layer made of a flexible material, and a third layer is the support layer made of a support material, wherein the support material may be any feasible support material known to the inventor, such as a soft rubber support sheet. The angle sensor may be arranged on an inner surface of the first display layer, the second display layer or the support layer, namely, on a surface, close to the body, of each layer.

The angle sensor of the disclosure may be any structure known to the inventor that may sense an included angle between two sub-screens, and those skilled in the art may select angle sensors with appropriate structures according to actual conditions, such as, ™R angle sensors.

In one embodiment, any two adjacent sub-screens are a first sub-screen 11 and a second sub-screen 12. As shown in FIG. 1, the angle sensor 40 includes a magnet part 41 and an induction part 42, wherein the magnet part 41 is located on a surface of the first sub-screen 11, and the induction part 42 is located at on a surface of the second sub-screen 12. When the included angle between the first sub-screen 11 and the second sub-screen 12 changes, a magnetic field of the magnet part 41 changes, and an electronic signal of the induction part 42 changes. Therefore, a change of the included angle between the first sub-screen 11 and the second sub-screen 12 may be determined by the electronic signal of the induction part 42.

In order to enable the induction part to more accurately sense the change of the magnet part, so as to further ensure that the angle sensor may more accurately acquire the included angle between the first sub-screen and the second sub-screen. In one embodiment of the disclosure, the magnet part is mirror imaging symmetrical to the induction part based on the interface between the first sub-screen and the second sub-screen.

The number of the angle sensor of the disclosure may be set according to actual conditions, and in order to further accurately obtain the included angle between the first sub-screen and the second sub-screen, in one embodiment of the disclosure, there are a plurality of angle sensors and the plurality of angle sensors are arranged at intervals. In this way, a plurality of included angles between the first sub-screen and the second sub-screen may be obtained by the plurality of angle sensors, and an average of the above included angles is calculated and serves as the included angle between the first sub-screen and the second sub-screen.

It should be noted that the plurality of angle sensors may be arranged in an appropriate direction, may be arranged at intervals in a length direction of a rotary shaft, or may be arranged at intervals in a direction perpendicular to the length direction of the rotary shaft.

The display screen of the disclosure may be a flexible display screen or a non-flexible display screen, as long as the display screen may be divided into a plurality of sub-screens, and extending directions of the plurality of sub-screens may be different. In one embodiment, the display screen is a flexible display screen, and the user may fold or unfold, according to actual requirements, the flexible display screen.

In order to conveniently control the movements of the sub-screens, as shown in FIG. 1, in one embodiment of the disclosure, the display screen 10 further includes the rotary shaft 13 connected between at least two adjacent sub-screens, wherein the rotary shaft 13 is connected with the actuating structure 20, and the actuating structure 20 is configured to deform to drive the rotary shaft 13 to rotate, so as to make the included angle between at least two adjacent sub-screens change.

The rotary shaft of the disclosure may be any feasible rotary shaft known to the inventor, specifically may be, according to actual conditions, the mechanical rotary shaft or the flexible rotary shaft.

In order to enable the included angle between the first sub-screen and the second sub-screen to reach the predetermined included angle efficiently and accurately, in one embodiment of the disclosure, the plurality of actuating structures are arranged at intervals in the length direction of the rotary shaft.

The actuating structure of the disclosure may be made of any material that deforms at different temperatures, namely, materials with different shapes at different temperatures, and those skilled in the art may select an appropriate material to make the actuating structure according to actual conditions. In one embodiment of the disclosure, the actuating structure may be made of memory metal such that it is ensured that the actuating structure may well drive the sub-screens to move.

According to the embodiments of the disclosure, the disclosure provides a control method for an electronic device, wherein the control apparatus is any one of the above electronic devices, and as shown in FIG. 1, the electronic device includes a body, a display screen 10, an actuating structure 20 and a current drive structure 30, and connection relations between all the parts may be seen from the foregoing description.

Figure 2:
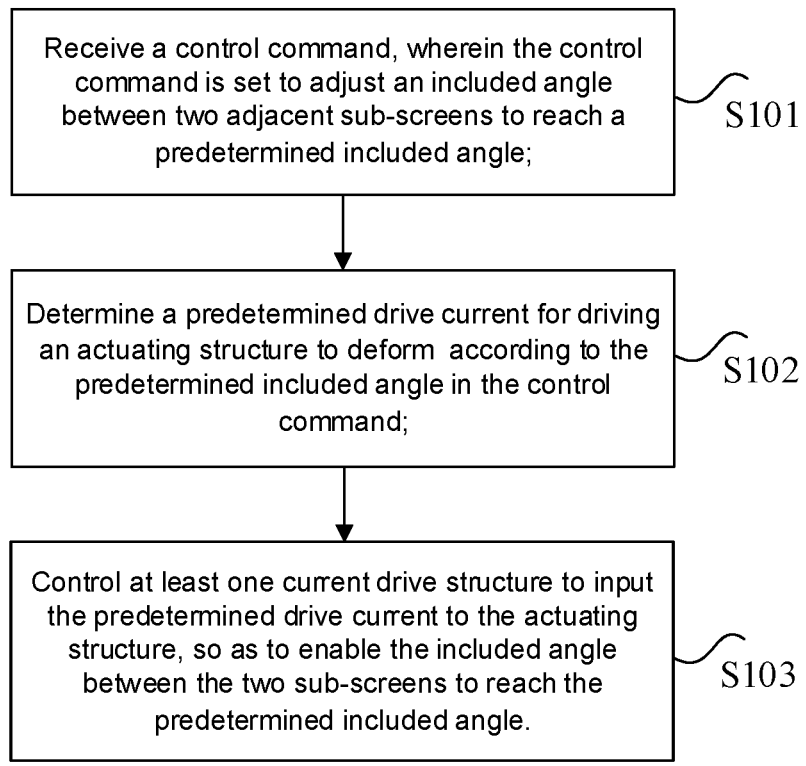
FIG. 2 shows a flow schematic diagram of a control method for an electronic device according to the disclosure.

FIG. 2 shows a flow schematic diagram according to the control method for the electronic device of the disclosure. As shown in FIG. 2, the method includes:

step S101, receive a control command, wherein the control command is set to adjust an included angle between two adjacent sub-screens to reach a predetermined included angle;

step S102, determine a predetermined drive current for driving an actuating structure to deform according to the predetermined included angle in the control command; and step S103, control at least one current drive structure to input the predetermined drive current to the actuating structure, so as to enable the included angle between the two sub-screens to reach the predetermined included angle.

It should be noted that steps shown in the flow diagrams of the accompanying drawings may be implemented in a computer system such as a set of computer-executable instructions, and although a logical order is shown in the flow diagrams, under some conditions, the steps shown or described may be implemented in an order different from that herein.

In the control method, the control command which is set to adjust an included angle between two adjacent sub-screens to reach a predetermined included angle is received; then the predetermined drive current for driving the actuating structure to deform is determined according to the predetermined included angle in the control command; and the current drive structure is controlled to input the predetermined drive current to the actuating structure, so as to enable the included angle between the two sub-screens reach the predetermined included angle. The control method may control the included angle between two adjacent sub-screens to reach the predetermined included angle according to the control command, and a user does not need to fold or unfold the display screen by hand, such that user experience is good.

In a practical use process, a method for determining a predetermined drive current may be any feasible method according to a control command, in one embodiment of the disclosure, the step of determining the predetermined drive current for driving an actuating structure to deform according to the predetermined included angle in the control command, includes: determine a predetermined deformation quantity of the actuating structure according to the predetermined included angle; and determine the predetermined drive current corresponding to the predetermined deformation quantity according to a relation between a deformation quantity of the actuating structure and a drive current. In this embodiment, the relation between the deformation quantity of the actuating structure and the drive current need to be obtained in advance.

In order to more accurately determine the deformation quantity, in one embodiment of the disclosure, the step of determining a predetermined deformation quantity of the actuating structure according to the predetermined included angle, includes: acquire a current included angle, which is predetermined and controlled, between the two adjacent sub-screens; determine a difference of included angle between the two sub-screens according to the predetermined included angle in the control command and the current included angle; and determine the predetermined deformation quantity according to the difference.

Of course, the method for determining a predetermined deformation quantity of the disclosure is not limited to the above method, but may be other appropriate methods. For example, in the case that the electronic device always controls, by the control command, the included angle between the adjacent sub-screens, the included angle between the two sub-screens may be determined by acquiring the last control command.

The control command of the disclosure may be a text command, a voice command or any other appropriate control command. In order to enable the control method to control the included angle between the two adjacent sub-screens more efficiently and conveniently, in one embodiment of the disclosure, the control command is a voice control command, for example, the included angle between the adjacent two sub-screens is controlled to be adjusted to reach the predetermined angle through a voice "Gree mobile phone, help me unfold the screen to 110 degrees".

The embodiment of the disclosure further provides a control apparatus for an electronic device, and it should be noted that the control apparatus for the electronic device of the embodiments of the disclosure may implement the control method for the electronic device, provided in the embodiments of the disclosure. The control apparatus for the electronic device provided in the embodiments of the disclosure will be described below.

Figure 3:
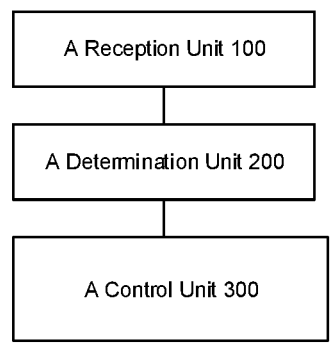
FIG. 3 shows a structural schematic diagram of a control apparatus for an electronic device according to the disclosure.

FIG. 3 is a schematic diagram according to the control apparatus for the electronic device of the disclosure. The control apparatus is any one of the above electronic devices. As shown in FIG. 1, the electronic device includes a body, a display screen 10, an actuating structure 20 and a current drive structure 30, and connection relations between all the parts may be seen from the foregoing description. As shown in FIG. 3, the apparatus includes:

a reception unit 100, which is configured to receive a control command, wherein the control command is set to adjust an included angle between two adjacent sub-screens to reach a predetermined included angle;

a determination unit 200, which is configured to determine a predetermined drive current for driving an actuating structure to deform according to the predetermined included angle in the control command; and a control unit 300, which is configured to control at least one current drive structure to input the predetermined drive current to the actuating structure, so as to enable the included angle between the two sub-screens to reach the predetermined included angle.

In the control apparatus, the reception unit receives the control command, which is set to adjust an included angle between two adjacent sub-screens to reach a predetermined included angle; the determination unit determines the predetermined drive current for driving the actuating structure to deform according to the predetermined included angle in the control command; and then the control unit controls the current drive structure to input the predetermined drive current to the actuating structure, so as to enable the included angle between the two sub-screens to reach the predetermined included angle. The control apparatus may control the included angle between the two adjacent sub-screens to reach the predetermined included angle according to the control command, and a user does not need to fold or unfold the display screen by hand, such that user experience is good.

In a practical use process, the determination unit may implement the above functions by any feasible process. In one embodiment of the disclosure, the determination unit includes a first determination module and a second determination module, wherein the first determination module is configured to determine a predetermined deformation quantity of the actuating structure according to the predetermined included angle, and the second determination module is configured to determine a predetermined drive current corresponding to the predetermined deformation quantity according to a relation between a deformation quantity of the actuating structure and a drive current. In this embodiment, the determination unit further includes an acquisition module, which is configured to acquire the relation between the deformation quantity of the actuating structure and the drive current.

In order to more accurately determine the deformation quantity, in one embodiment of the disclosure, the first determination module is configured to acquire a current included angle, which is predetermined and controlled, between the two adjacent sub-screens; the first determination module is further configured to determine a difference of included angle between the two sub-screens according to the predetermined included angle in the control command and the current included angle; and then, determine the predetermined deformation quantity according to the difference.

Of course, the first determination module is not limited to implement the above process, and may also implement other processes. For example, in the case that the electronic device always controls the included angle between the adjacent sub-screens by means of the control command, the first determination module may determine the included angle between the two sub-screens by acquiring the last control command.

The control command of the disclosure may be a text command, a voice command or any other appropriate control command. In order to enable the control method to control the included angle between the two adjacent sub-screens more efficiently and conveniently, in one embodiment of the disclosure, the control command is a voice control command, for example, the included angle between the adjacent two sub-screens is controlled to be adjusted to reach the predetermined angle through a voice "Gree mobile phone, help me unfold the screen to 110 degrees". Correspondingly, the reception unit is a voice reception unit, such as the microphone as shown in FIG. 1.

The control apparatus for the electronic device includes a processor and a memory, wherein the reception unit, the determination unit, the control unit and the like, as program units, are stored in the memory, and the processor executes the program units stored in the memory to realize the corresponding functions.

The processor includes a core, and the core calls corresponding program units in the memory. One or more cores may be set. The included angle between the two adjacent sub-screens of the electronic device is automatically adjusted to reach the predetermined included angle by adjusting core parameters.

The memory may be a Volatile Memory, a Random Access Memory (RAM) and/or a Non-Volatile Memory, etc., such as a Read-Only Memory (ROM) or a flash RAM, in a computer-readable medium, and the memory includes at least one memory chip.

The embodiment of the disclosure further provides an electronic device, wherein the electronic device includes: a body, a display screen, an actuating structure, a drive structure and a control apparatus. FIG. 1 is a local schematic diagram, wherein the display screen is located on a surface of the body and includes a plurality of sub-screens; the actuating structure is connected with the display screen and configured to deform at different temperatures to change an included angle between at least two adjacent sub-screens; and the drive structure is electrically connected with the actuating structure and configured to input current to the actuating structure to deform the actuating structure; and the control apparatus is configured to at least control operation of the current drive structure.

The electronic device includes the actuating structure and the current drive structure, and since the actuating structure deforms under the action of different currents, that is, shapes of the actuating structure are different under the action of different currents, the current drive structure provides different currents to the actuating structure to enable the shapes of the actuating structure to vary. Therefore, in the electronic device, the control apparatus drives the current drive structure to introduce the predetermined drive current to the actuating structure such that the actuating structure may generate predetermined deformation; and through predetermined deformation of the actuating structure, the included angle between at least two adjacent sub-screens may be a predetermined included angle, thereby meeting user requirements. That is, the electronic device may control the included angle between any two adjacent sub-screens to reach a predetermined included angle by merely controlling the current of the current drive structure, and a user does not need to fold or unfold the display screen by hand, such that user experience is good.

The embodiments of the disclosure provides a storage medium storing a program, wherein when the program is executed by a processor, a control method for an electronic device is implemented.

The embodiments of the disclosure provides a processor configured to run a program, wherein when the program is run, a control method for an electronic device is implemented.

The embodiments of the disclosure provides a device, wherein the device includes a processor, a memory and a program that is stored in the memory and may be run on the processor, and when the processor runs the program, at least the following steps are implemented:

step S101, receive a control command, wherein the control command is set to adjust an included angle between two adjacent sub-screens to reach a predetermined included angle;

step S102, determine a predetermined drive current for driving an actuating structure to deform according to the predetermined included angle in the control command; and step S103, control the predetermined drive current to drive the actuating structure to deform.

The device herein may be a server, a PC (Personal Computer), a PAD, a mobile phone, etc.

The disclosure further provides a computer program product, which is suitable for executing, when executed on a data processing device, a program initialized to have at least the following method steps:

step S101, receive a control command, wherein the control command is set to adjust an included angle between two adjacent sub-screens to reach a predetermined included angle;

step S102, determine a predetermined drive current for driving an actuating structure to deform according to the predetermined included angle in the control command; and step S103, control the predetermined drive current to drive the actuating structure to deform.

Those skilled in the art should understand that the embodiments of the disclosure may provide methods, systems, or computer program products. Therefore, the disclosure may employ full hardware embodiments, full software embodiments, or software and hardware combined embodiments. Moreover, the disclosure may employ a computer program product implemented on one or more computer storage medium (including, but not limited to, disc memories, Compact Disc Read-Only Memories (CD-ROM), optical memories, etc.) containing computer program codes.

The disclosure is described with reference to flow diagrams and/or block diagrams of methods, devices (systems), and computer program products in the embodiments of the disclosure. It should be understood that each flow and/or block in the flow diagrams and/or block diagrams and combinations of the flows and/or blocks in the flow diagrams and/or block diagrams may be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing functions specified in one or more flows of each flow diagrams and/or one or more blocks of each block diagram.

These computer program instructions may also be stored in a computer readable memory that may guide a computer or other programmable data processing devices to work in a specific manner, such that the instructions stored in the computer readable memory produce an article of manufacture including an instruction device, and the instruction device implements functions specified in one or more flows of each flow diagram and/or one or more blocks in each block diagram.

These computer program instructions may also be loaded onto the computer or other programmable data processing devices, such that a series of operating steps are implemented on the computer or other programmable devices to generate computer-implemented processing, and instructions executed on the computer or other programmable devices provide steps for implementing the functions specified in one or more flows of each flow diagram and/or one or more blocks in each block diagram.

In a typical configuration, a computing device includes one or more Central Processing Units (CPU), an input/output interface, a network interface, and a memory.

The memory may be a Volatile Memory, a Random Access Memory (RAM)/or a Non-Volatile Memory, etc., such as a Read-Only Memory (ROM) or a flash RAM, in a computer-readable medium, and the memory is an example of a computer-readable medium.

Computer-readable media include permanent and non-permanent, removable and non-removable media, and information may be stored by any method or technique. The information may be computer-readable instructions, data structures, program modules, or other data. Examples of storage medium for a computer include, but are not limited to, a Phase-Change Random Access Memory (PRAM), a Static Random Access Memory (SRAM), a Dynamic Random Access Memory (DRAM), other types of Random Access Memories (RAM), a Read-Only Memory (ROM), an electronically Erasable Programmable Read-Only Memory (EEPROM), a flash Memory or other memory technologies, a Compact Disc Read-Only Memory (CD ROM), a Digital Versatile Discs (DVD) or other optical memories, a cassette magnetic tape, a magnetic tape or magnetic disc memory or other magnetic memory devices, or any other non-transmission medium, which may be configured to store information that may be accessed by a computing device. As defined herein, the computer-readable media do not include transitory media, such as modulated data signals and carrier waves.

It should be noted that, terms "include", "contain", or any other variations thereof are intended to cover non-exclusive inclusions, such that processes, methods, commodities, or devices including a series of elements not only include those elements, but also include other elements that are not explicitly listed, or also includes inherent elements of the process, the method, the commodities, or the devices. Without more restrictions, the elements defined by the sentence "includes a . . . " do not exclude the existence of other identical elements in the processes, methods, commodities, or devices including the elements.

Those skilled in the art should understand that the embodiments of the disclosure may provide methods, systems, or computer program products. Therefore, the disclosure may employ full hardware embodiments, full software embodiments, or software and hardware combined embodiments. Moreover, the disclosure may employ a computer program product implemented on one or more computer storage medium (including, but not limited to, disc memories, CD-ROM, optical memories, etc.) containing computer program codes.

From the above description, it may be seen that the above embodiments of the disclosure achieves the following technical effects:

1) The electronic device of the disclosure includes the actuating structure and the current drive structure, and since shapes of the actuating structure are different at different temperatures, the current drive structure provides different current to the actuating structure to enable temperatures of the actuating structure to vary, such that the shapes of the actuating structure may vary. Therefore, in the electronic device, by introducing, by means of the current drive structure, the predetermined drive current to the actuating structure, the actuating structure may generate predetermined deformation; and through predetermined deformation of the actuating structure, the included angle between at least two adjacent sub-screens may be the predetermined included angle, thereby meeting user requirements. That is, the electronic device may control the included angle between the two adjacent sub-screens to reach a predetermined included angle by merely controlling the current of the current drive structure, and a user does not need to fold or unfold the display screen by hand, such that user experience is good.

2) In the control method of the disclosure, the control command, which is set to adjust an included angle between two adjacent sub-screens to reach a predetermined included angle, is received; then according to the predetermined included angle, the predetermined drive current for driving the actuating structure to deform is determined; and the current drive structure is controlled to input the predetermined drive current to the actuating structure, so as to enable the included angle between the two sub-screens to reach the predetermined included angle. The control method may control the included angle between the two adjacent sub-screens to reach the predetermined included angle according to the control command, and the user does not need to fold or unfold the display screen by hand, such that user experience is good.

3) In the control apparatus of the disclosure, the reception unit receives the control command, which is set to adjust an included angle between two adjacent sub-screens to reach a predetermined included angle; the determination unit determines the predetermined drive current for driving the actuating structure to deform according to the predetermined included angle; and then the control unit controls the current drive structure to input the predetermined drive current to the actuating structure, so as to enable the included angle between the two sub-screens to reach the predetermined included angle. The control apparatus may control the included angle between the two adjacent sub-screens to reach a predetermined included angle according to the control command, and the user does not need to fold or unfold the display screen by hand, such that user experience is good.

The above-mentioned embodiments are merely the preferred embodiments of the disclosure and are not intended to limit the disclosure; and for those skilled in the art, various modifications and changes may be made for the disclosure. Any modifications, equivalent substitutions, improvements, etc. made within the spirit and principle of the disclosure shall all fall within the protection scope of the disclosure.

What is claimed is:

1. An electronic device, comprising:
   a body;
   a display screen, located on a surface of the body, wherein the display screen comprises a plurality of sub-screens;
   an actuating structure, connected with the display screen and configured to deform at different temperatures to change an included angle between at least two adjacent sub-screens; and
   at least one current drive structure, electrically connected with the actuating structure and configured to input current to the actuating structure to deform the actuating structure;
   wherein, the electronic device further comprises:
   at least one angle sensor, located at an interior or on a surface of the display screen and configured to sense the included angle between any two adjacent sub-screens of the display screen;
   wherein any two adjacent sub-screens are a first sub-screen and a second sub-screen, and the angle sensor comprises a magnet part and an induction part, the magnet part is located at an interior or on a surface of the first sub-screen, and the induction part is located at an interior or on a surface of the second sub-screen;
   wherein the display screen further comprises a rotary shaft connected between at least two adjacent sub-screens, wherein the rotary shaft is connected with the actuating structure, and the actuating structure is configured to deform to drive the rotary shaft to rotate, so as to make the included angle between at least two adjacent sub-screens change;
   wherein use the following steps to control the electronic device:
   determining a predetermined drive current for driving the actuating structure to deform according to a predetermined included angle in a control command, and controlling at least one current drive structure to input the predetermined drive current to the actuating structure, so as to enable the included angle between the two sub-screens to reach the predetermined included angle;
   determining a predetermined drive current for driving the actuating structure to deform according to the predetermined included angle in the control command, comprises:
   determining predetermined deformation quantity of the actuating structure according to the predetermined included angle; and
   determining the predetermined drive current corresponding to the predetermined deformation quantity, according to a relation between a deformation quantity of the actuating structure and a drive current;
   determining predetermined deformation quantity of the actuating structure, according to the predetermined included angle, comprises:
   acquiring a current included angle, which is predetermined and controlled, between the two adjacent sub-screens;
   determining a difference of included angle between the two sub-screens according to the predetermined included angle in the control command and the current included angle; and
   determining the predetermined deformation quantity, according to the difference.

2. The electronic device as claimed in claim 1, wherein the magnet part is mirror imaging symmetrical to the induction part based on an interface between the first sub-screen and the second sub-screen.

3. The electronic device as claimed in claim 1, wherein the electronic device comprises a plurality of angle sensors and the plurality of angle sensors are arranged at intervals.

4. The electronic device as claimed in claim 1, wherein the display screen is a flexible display screen.

5. The electronic device as claimed in claim 1, wherein the electronic device comprises a plurality of actuating structures and the plurality of actuating structures are arranged at intervals in a length direction of the rotary shaft.

6. The electronic device as claimed in claim 1, wherein the actuating structure is made of memory metal.

7. The electronic device as claimed in claim 1, wherein the control command is a voice control command.

8. A non-transitory computer-readable storage medium, comprising a stored program, in an electronic device that includes a body, a display screen, located on a surface of the body, wherein the display screen comprises a plurality of sub-screens, an actuating structure, connected with the display screen and configured to deform at different temperatures to change an included angle between at least two adjacent sub-screens, and
   at least one current drive structure, electrically connected with the actuating structure and configured to input current to the actuating structure to deform the actuating structure,
   wherein, the electronic device further comprises:
   at least one angle sensor, located at an interior or on a surface of the display screen and configured to sense the included angle between any two adjacent sub-screens of the display screen,
   wherein any two adjacent sub-screens are a first sub-screen and a second sub-screen, and the angle sensor comprises a magnet part and an induction part, the magnet part is located at an interior or on a surface of the first sub-screen, and the induction part is located at an interior or on a surface of the second sub-screen, and
   wherein the display screen further comprises a rotary shaft connected between at least two adjacent sub-screens, wherein the rotary shaft is connected with the actuating structure, and the actuating structure is configured to deform to drive the rotary shaft to rotate, so as to make the included angle between at least two adjacent sub-screens change, and wherein the program implements following actions:

determine a predetermined drive current for driving the actuating structure to deform according to a predetermined included angle in a control command, and control at least one current drive structure to input the predetermined drive current to the actuating structure, so as to enable the included angle between the two sub-screens to reach the predetermined included angle;

determine a predetermined drive current for driving the actuating structure to deform according to the predetermined included angle in the control command, comprises:

determine predetermined deformation quantity of the actuating structure according to the predetermined included angle; and determine the predetermined drive current corresponding to the predetermined deformation quantity, according to a relation between a deformation quantity of the actuating structure and a drive current;

acquire a current included angle, which is predetermined and controlled, between the two adjacent sub-screens;

determine a difference of included angle between the two sub-screens according to the predetermined included angle in the control command and the current included angle; and determine the predetermined deformation quantity, according to the difference.

* * * * *